(12) United States Patent
Lai et al.

(10) Patent No.: US 6,281,311 B1
(45) Date of Patent: Aug. 28, 2001

(54) CONTROLLED FREE RADICAL POLYMERIZATION PROCESS

(75) Inventors: John Ta-yuan Lai, Broadview Heights; William F. Masler, Hinckley; Paul Peter Nicholas, Broadview Heights; Nasar Pourahmady, Solon; Rutger D. Puts, Cleveland Heights; Shonali Tahiliani, Belpre, all of OH (US)

(73) Assignee: PMD Holdings Corp., Brecksville, OH (US)

( * ) Notice: Subject to any disclaimer, the term of this patent is extended or adjusted under 35 U.S.C. 154(b) by 0 days.

(21) Appl. No.: 08/828,991

(22) Filed: Mar. 31, 1997

(51) Int. Cl.$^7$ ................................. C08F 2/00; C08F 4/28; C08F 4/32

(52) U.S. Cl. .................... 526/220; 526/204; 526/209; 526/217; 526/227; 526/230; 526/232.1; 526/236; 526/319; 526/320; 526/328; 526/341; 526/343; 526/344; 526/346

(58) Field of Search ....................................... 526/204, 220, 526/227, 232.1, 236, 217, 209

(56) References Cited

U.S. PATENT DOCUMENTS

| | | | | |
|---|---|---|---|---|
| 4,670,131 | * | 6/1987 | Ferrell | 208/48 |
| 5,254,760 | * | 10/1993 | Winter | 585/5 |
| 5,322,912 | * | 6/1994 | Georges | 526/204 |
| 5,401,804 | * | 3/1995 | Georges | 525/267 |
| 5,412,047 | * | 5/1995 | Georges | 526/204 |

FOREIGN PATENT DOCUMENTS

WO 9411412    5/1994  (WO).

* cited by examiner

*Primary Examiner*—Fred Zitomer
(74) *Attorney, Agent, or Firm*—Thoburn T. Dunlap; George W. Moxon, II

(57) ABSTRACT

A polymerization process for the preparation of (meth) acrylate containing homopolymers or block copolymers comprises heating a mixture of a free radical initiator, a stable free radical agent, and a polymerizable monomer compound to form a thermoplastic resin or resins with a narrow polydispersity. The stable free radical agent is a piperazinone or morpholone based nitroxide or any adducts thereof.

93 Claims, No Drawings

CONTROLLED FREE RADICAL POLYMERIZATION PROCESS

BACKGROUND OF THE INVENTION

1. Field of the Invention

This invention relates to the application of new nitroxides in the controlled free radical polymerization of a thermoplastic resin or resins. More particularly, the invention relates to a controlled free radical polymerization process wherein piperazinone and morpholone based nitroxides as well as their adducts are used to provide styrene and (meth)acrylate homopolymers and block copolymer resin products characterized by high monomer to polymer conversion and possessing narrow polydispersity properties.

2. Description of the Prior Art

Stable Free Radical Polymerization (SFRP) refers to a free radical polymerization in the presence of a stable free radical such as a nitroxide. The nitroxide traps carbon-centered radicals to form adducts. The trapping is reversible but the equilibrium is such that most (99%) polymer chains are dormant and only a very small fraction is dissociated. Thus, the concentration of free radicals is effectively lowered at all times in the polymerization as shown below, wherein P• represents the growing polymer radical, •ON represents the nitroxide, and M represents a monomer.

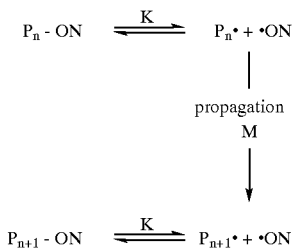

This in turn affects propagation and transfer rates but has an even greater effect on termination, since the latter is second order in radical concentration.

Thus, stable free radical polymerization minimizes chain termination reactions, while improving molecular weight and polymer architecture control. On the other hand, the SFRP technology slows down the polymerization process.

In U.S. Pat. No. 5,412,047, issued May 2, 1995 to Georges, et al., processes for the preparation of homopolymers of (meth)acrylic monomers and copolymers containing (meth)acrylate segments by nitroxide mediated polymerization are shown. The polymerization process comprises heating a mixture of a free radical initiator and an oxo-nitroxide, specifically 4-oxo-TEMPO (4-oxo-2,2,6,6-tetramethyl-1-piperidinyloxy), as a stable free radical agent, at least one polymerizable (meth)acrylate monomer compound, and optionally a solvent, to form a homopolymeric (meth)acrylate containing thermoplastic resin or resins with a high monomer to polymer conversion and a narrow polydispersity.

Examples of other stable free radical compounds said to be suitable for use in the '047 Patent include: 2,2,6,6-tetramethyl-1-piperidinyloxy free radical (TEMPO); 4-hydroxy-2,2,6,6-tetramethyl-1-piperidinyloxy free radical; 2,2,5,5-tetramethyl-1-pyrrolidinyloxy; 3-carboxy-2,2,5,5-tetramethyl-1 pyrrolidinyloxy; and ditert-butyl nitroxide. As noted in the '047 Patent, though, surprisingly and unexpectedly, the aforementioned stable free radical compounds, and related derivatives, while said to be quite satisfactory for the purpose of moderating the polymerization of a wide variety of different monomer types and comonomers, are completely ineffective when used in homopolymerizations of (meth)acrylate monomers. That is to say, no homopolymeric product formation could be detected by GPC when a mixture of n-butyl acrylate, a free radical initiator such as benzoyl peroxide or AIBN, and a stable free radical compound of the type listed in the '047 Patent were heated for about 10 hours at about 140° C.

A solution to the problem of forming (meth)acrylate copolymers and copolymers was said to be achieved in the '047 Patent by substituting, for example, the carbonyl containing stable free radical 4-oxo-2,2,6,6-tetramethyl-1-piperidinyloxy (4-oxo-TEMPO) in place of the aforementioned ineffective stable free radical compounds. However, 4-oxo-TEMPO is not a stable free radical when heated above 100° C. in the presence of carbon radicals. Under these conditions it is known by those skilled in the art that 4-oxo-TEMPO decomposes rapidly to phorone and other non-radical compounds as set out in Volodarsky, L. B. et al., "Synthetic Chemistry of Stable Nitroxides", p. 50 (CRC Press 1993) and Yoshioka, T., Higa Shida, S., Morimura, S., and Murayama, K., 44 Bull. Chem. Soc. Jpn., Volume 44, pp. 2207–2210 (1971).

All nitroxides based on TEMPO and its derivatives and used by the inventors of the '047 Patent, including 4-oxo-TEMPO, are problematic, particularly when used in the synthesis of (meth)acrylate homopolymers, styrene-n-butyl acrylate block copolymers, and n-butyl acrylate-styrene block copolymers, in that the polymers can not be synthesized in a controlled fashion with high yields. Further, these nitroxides are undesirable for various practical reasons— that is, the nitroxides cannot be synthetically modified easily. Nor do the nitroxides have a long shelf-life.

Thus, there remains a need for a controlled free radical polymerization process, which can be used to simply and economically synthesize high yields of (meth)acrylate homopolymers as well as styrene-n-butyl acrylate or n-butylacrylate-styrene block copolymers. In this regard, a need also exists for a stable free radical nitroxide for use in the polymerization process, which can be easily synthesized and stored over long periods of time.

INCORPORATION BY REFERENCE

U.S. Pat. Nos. 5,412,047, 4,914,232, 4,466,915, 5,401,804, and 4,581,429 are incorporated by reference herein as background information with respect to the present invention.

BRIEF SUMMARY OF THE INVENTION

We have discovered that piperazinone and morpholone based nitroxides as well as their adducts can be used in the (meth)acrylate polymerization processes of the '047 Patent with unexpectedly high efficiencies. These nitroxides are advantageous in that they are easily synthesized, particularly with regard to tailoring the nitroxide structure to improve reaction rates, introduce functionality, and tailor solubility. Further, these nitroxides have an improved shelf-life stability, since they are highly crystalline and can be stored indefinitely at room temperature or higher.

In addition, these nitroxides, quite unexpectedly, can be used to efficiently make high yields of styrene-n-butyl acrylate or n-butyl acrylate-styrene block copolymers with narrow polydispersities (1.0–3.0) simply and economically, while controlling both molecular weight and composition. Indeed, when used in the preparation of these styrene-block-acrylate copolymers, high yields of styrene or (meth)acrylate prepolymer are obtained in the first step of the polymerization process, thus enabling high yields of the styrene-block-(meth)acrylate copolymers in the second step of the polymerization process.

Block copolymers made in the presence of stable free radicals have been claimed in U.S. Pat. Nos. 5,322,912, 5,401,804, 5,449,998 and 5,545,504 but have only been reduced to practice for a styrene-styrene sulfonate diblock copolymer. We have found that (meth)acrylate containing block copolymers cannot be made using the nitroxides claimed in the aforementioned patents.

In addition, use of our nitroxides for styrene or (meth) acrylate homopolymerization showed a distinct rate advantage over TEMPO and its derivatives.

The present invention, then, provides an improvement in the process for the stable free radical polymerization by using new nitroxides to make homopolymers of (meth) acrylate monomers and copolymers containing (meth) acrylate segments by nitroxide mediated polymerization.

According to a first aspect of the invention, a free radical polymerization process for the preparation of a thermoplastic resin or resins is disclosed, which comprises heating from about 80° C. to about 160° C. a mixture of a free radical initiator, at least one polymerizable monomer compound, and a stable free radical agent comprising a nitroxyl radical to form the thermoplastic resin or resins having a polydispersity from about 1.0 to about 3.0. The nitroxyl radical has the following formula:

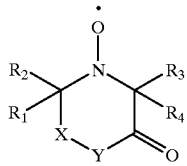

wherein X is $CH_2$ or $C=O$, Y is O or N—R, R, $R_1$, $R_2$, $R_3$, and $R_4$ are independently selected from the group consisting of aryl, alkyl having from 1 to about 24 carbon atoms, cycloalkyl having from 5 to about 7 carbon atoms, aralkyl having from 7 to about 20 carbon atoms, cyanoalkyl having from 2 to about 12 carbon atoms, ether having from 4 to about 18 carbon atoms, and hydroxyalkyl having from 1 to about 18 carbon atoms; and $R_1$ and $R_2$ together, or $R_3$ and $R_4$ together, or each pair, may be cyclized forming a ring having from about 5 to about 14 carbon atoms.

According to a second aspect of the present invention, a free radical polymerization process for the preparation of a thermoplastic resin or resins is disclosed, which comprises heating from about 80° C. to about 160° C. a mixture of at least one polymerizable monomer compound, and a preformed nitroxide adduct to form the thermoplastic resin or resins. The preformed nitroxide adduct has the following formula:

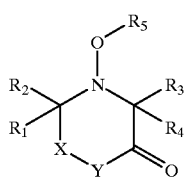

wherein X is $CH_2$ or $C=O$, Y is O or N—R, R, $R_1$, $R_2$, $R_3$, $R_4$, and $R_5$ are independently selected from the group consisting of aryl, alkyl having from 1 to about 24 carbon atoms, cycloalkyl having from 5 to about 7 carbon atoms, aralkyl having from 7 to about 20 carbon atoms, cyanoalkyl having from 2 to about 12 carbon atoms, ether having from 4 to about 18 carbon atoms, and hydroxyalkyl having from 1 to about 18 carbon atoms; and $R_1$ and $R_2$ together, or $R_3$ and $R_4$ together, or each pair, may be cyclized forming a ring having from about 5 to about 14 carbon atoms.

According to a third aspect of the invention, a free radical polymerization process for the preparation of a (meth) acrylate containing block copolymer is closed. In the first step, a first mixture of either (1) a free radical initiator; a first polymerizable monomer compound; and a stable free radical agent comprising the nitroxide radical having the formula disclosed above; or (2) a first polymerizable monomer compound and a preformed nitroxide adduct having the formula disclosed above is heated from about 80° C. to about 160° C. to form a prepolymer. In the second step, a second mixture containing the prepolymer and the second polymerizable compound is heated from about 80° C. to about 60° C., the second polymerizable monomer compound being different than the first polymerizable monomer compound.

One advantage of the present invention is that a new nitroxide useful in the controlled free radical polymerization of a thermoplastic resin or resins can be easily synthesized, particularly with regard to tailoring the nitroxide structure to improve reaction rates, introduce functionality, tailor solubility, etc.

Another advantage of the present invention is that a new nitroxide useful in the controlled radical polymerization of a thermoplastic resin or resins has an improved shelf-life stability. The new nitroxides are highly crystalline and can be stored indefinitely at room temperature (or higher), which cannot be said for TEMPO and its derivatives.

Still another advantage of the present invention is that a controlled radical polymerization process is disclosed wherein styrene can be polymerized at a faster rate.

Still another advantage of the present invention is that a controlled free radical polymerization process is disclosed wherein higher conversions in styrene and (meth)acrylate are achieved.

Still another advantage of the present invention is that styrene-block-acrylate copolymers can be synthesized using a controlled free radical polymerization process wherein high yields of a styrene or (meth)acrylate prepolymer are obtained in the first step of the polymerization process, thus enabling high yields of the styrene-block-(meth)acrylate copolymers in the second step of the polymerization process.

Still another advantage of the present invention is that a controlled radical polymerization process is disclosed wherein styrene-nBA block copolymers can be simply and economically synthesized.

Still another advantage of the present invention is that a controlled radical polymerization process is disclosed wherein nBA-styrene block copolymers can be simply and economically synthesized.

Still other benefits and advantages of the invention will become apparent to those skilled in the art upon a reading and understanding of the following detailed specification.

DETAILED DESCRIPTION OF THE PREFERRED EMBODIMENT

The present invention provides (meth)acrylate polymerization processes for preparing (meth)acrylate containing polymeric resins with well-defined molecular weight properties and narrow polydispersities.

The processes can be run as batch, semi-continuous or continuous processes. The polymerization process for the preparation of (meth)acrylate containing resins is initiated using a classical free radical initiator in the presence of a slight excess of free nitroxide and comprises heating a mixture comprised of a free radical initiator, a stable free radical agent, at least one polymerizable (meth)acrylate monomer compound, and optionally a solvent, to form a (meth)acrylate containing resin with a high monomer to polymer conversion and a narrow polydispersity. As used in the present specification, the terminology "(meth)acrylate containing" means that about 5 to 100 wt. % of the total monomer polymerized is a (meth)acrylate type monomer and that the (meth)acrylate monomer is polymerized in the presence of the stable free radical compound or nitroxide containing prepolymers.

Suitable for use as free radical initiators in the processes of the present invention include any conventional free radical initiators known in the art. These initiators can include oxygen, hydroperoxides, peresters, percarbonates, peroxides, persulfates and azo initiators. Specific examples of some suitable initiators include hydrogen peroxide, t-butyl hydroperoxide, ditertiary butyl peroxide, tertiary-amyl hydroperoxide, dibenzoyl peroxide (AIBN), potassium persulfate, and methylethyl ketone peroxide. The initiators are normally used in amounts of from about 0.01% to about 4% based on the weight of total polymerizable monomer. A preferred range is from about 0.05% to about 2% by weight of the total polymerizable monomer.

Redox initiators may also be used in the practice of the present invention and include sodium bisulfite, sodium sulfite, isoascorbic acid, sodium formaldehyde-sulfoxylate, and the like, used with suitable oxidizing agents, such as the thermal initiators noted above. If used, the redox initiators may be used in amounts of 0.001% to 5%, based on the weight of total monomer. A preferred range is from about 0.01 to about 3% by weight of total polymerizable monomer.

The stable free radical selected for use in the present invention are piperazinone and morpholone based nitroxides and their adducts. These nitroxides are critical to the success of the stable free radical polymerization process disclosed in the present invention. For example, controlled nitroxide mediated polymerization of n-butyl acrylate has not been reported in the prior art. The process described in the '047 Patent, wherein TEMPO and its derivatives are used as the nitroxide stable free radical agent, can only be controlled at very low conversions—that is, less than 15%.

In particular, the piperazinonyl nitroxides compare favorably to 4-oxo-TEMPO in the homopolymerization of n-butyl acrylate. Indeed, a comparison of our iBu nitroxide (TABLE I) and our C7 nitroxide (TABLE I) versus 4-oxo-TEMPO in a high temperature polymerization demonstrates large differences in the obtained yields and molecular weights as shown in Examples 13 and 14 and Comparative Example 2.

The synthesis of the piperazinone based nitroxides is shown below in Equation (1). An alternative morpholone based nitroxide, is shown in reaction (2), which uses a much more readily available amino alcohol starting material. The nitroxides are obtained in high yields by either method.

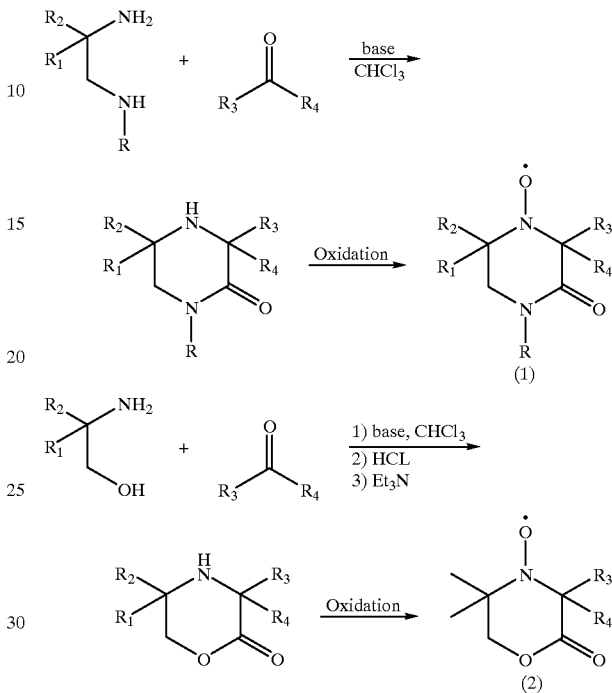

Certain piperazinone based nitroxides and morpholone based nitroxides obtained and used in the practice of the present invention, including their abbreviations, are listed below in TABLE I. The nomenclature adopted reflects the nature of the substituents introduced via the ketone.

TABLE I

| NITROXIDE STRUCTURE | ABBREVIATION | NITROXIDE STRUCTURE | ABBREVIATION |
|---|---|---|---|
|  | Dimethyl (1-tertbutyl-3,3,5,5-tetramethyl-2-piperazinone-oxide) |  | iBu (3-isobutyl-1-isopropyl-3,5,5-trimethyl-2-piperazinone-oxide) |

TABLE I-continued

| NITROXIDE STRUCTURE | ABBREVIATION | NITROXIDE STRUCTURE | ABBREVIATION |
|---|---|---|---|
| | Phenyl (1-isopropyl-3-phenyl-3,5,5-trimethyl-2-piperazinone-oxide) | | C5 (3,3-tetramethylene-5,5-dimethyl-1-isopropyl-2-piperazinone-oxide) |
| | C6 (3,3-pentamethylene-5,5-dimethyl-1-isopropyl-2-piperazinone-oxide) | | C7 (3,3-hexamethylene-5,5-dimethyl-1-isopropyl-2-piperazinone-oxide) |
| | diMe Morpholone (3,3,5,5-tetramethyl-2-morpholone-oxide) | | C6 Morpholone (3,3-pentamethylene-5,5-dimethyl-2-morpholone-oxide) |
| | C7 Morpholone (3,3-hexamethylene-5,5-dimethyl-2-morpholone oxide) | | Dicyclohexyl (bis-3,3,5,5-pentamethylene-2,6-piperazinone-dione-oxide) |

One class of carboxylic acid or acrylic monomers suitable for use in the present invention are $C_3$–$C_6$ monoethylenically unsaturated monocarboxylic acids, and the alkaline metal and ammonium salts thereof. The $C_3$–$C_6$ monoethylenically unsaturated monocarboxylic acids include acrylic acid, methacrylic acid, crotonic acid, vinyl acedic acid, and acryloxypropionic acid. Acrylic acid and methacrylic acid are the preferred monoethylenically unsaturated monocarboxylic acid monomers.

Another class of carboxylic acid monomers suitable for use in the present invention are $C_4$–$C_6$ monoethylenically unsaturated dicarboxylic acids and the alkaline metal and ammonium salts thereof, and the anhydrides of the cis dicarboxylic acids. Suitable examples include maleic acid, maleic anhydride, itaconic acid, mesaconic acid, fumaric acid, and citraconic acid. Maleic anhydride and itaconic acid are preferred monoethylenically unsaturated dicarboxylic acid monomers.

The acid monomers useful in this invention may be in their acid forms or in the form of the alkaline metal or ammonium salts of the acid. Suitable bases useful for neutralizing the monomer acids includes sodium hydroxide, ammonium hydroxide, potassium hydroxide, and the like. The acid monomers may be neutralized to a level of from 0 to 50% and preferably from 0 to about 20%. More preferably, the carboxylic acid monomers are used in the completely neutralized form.

In addition, up to 100% by weight of the total polymerizable monomers may be monoethylenically unsaturated carboxylic acid-free monomers. Typical monoethylenically unsaturated carboxylic acid-free monomers suitable for use in the invention include alkyl esters of acrylic or methacrylic acids such as methyl acrylate, ethyl acrylate, butyl acrylate; hydroxyalkyl esters of acrylic or methacrylic acid such as hydroxyethyl acrylate, hydroxypropyl acrylate, hydroxyethyl methacrylate, and hydroxypropyl methacrylate; acrylamide, methacrylamide, N-tertiary butylacrylamide, N-methylacrylamide, N,N-dimethyl acrylamide; acrylonitrile, methacrylonitrile, dimethylaminoethyl acrylate, dimethylaminoethyl methacrylate, phosphoethyl methacrylate, N vinyl pyrrolidone, N-vinylformamide, N-vinylimidazole, vinyl acetate, styrene, hydroxylated styrene, styrenesulfonic acid and salts thereof, vinylsulfonic acid and salts thereof, and 2-acrylamido-2-methylpropanesulfonic acid and salts thereof.

Other suitable comonomers include acrylamides, alkyl and aryl amide derivatives thereof, and quaternized alkyl and aryl acrylamide derivatives.

Monomers, polymers and copolymers of the present invention can, in embodiments, be separated from one another or from the polymerization reaction mixture by, for example, changing the pH of the reaction media and other well-known conventional separation techniques.

In the (meth)acrylate polymerization of the present invention, reactions can be supplemented with a solvent or co-solvent to help insure that the reaction mixture remains a homogeneous single phase throughout the monomer conversion. However, in the preferred embodiment, the (meth)acrylate polymerization reactions are carried out in the absence of a solvent.

Exemplary solvent or co-solvents useful in the present invention include compatible aliphatic alcohols, glycols, ethers, glycol ethers, pyrrolidones, N-alkyl pyrrolidones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives such as CARBITOL® or CELLOSOLVE®, amino alcohols, ketones, and the like, derivative thereof, and mixtures thereof. Specific examples include ethylene glycol, propylene glycol, diethylene glycol, glycerine, dipropylene glycol, tetrahydrofuran, and the like, and mixtures thereof. When mixtures of water and water soluble or miscible organic liquids are selected as the reaction media, the water to co-solvent weight ratio typically ranges from about 100:0 to about 10:90, and preferably from about 97:3 to about 25:75.

Temperature of the polymerization may range from about 80° C. to about 160° C., preferably from about 110° C. to about 130° C. At temperatures above about 180° C., conversion of the monomer into polymer decreases and uncertain and undesirable by-products are formed. Frequently, these by-products discolor the polymer mixture and may necessitate a purification step to remove them or they may be intractable.

Since solvent and co-solvent admixtures can be used as the reaction media, the elevated temperatures of the polymerization require that the polymerization reactor be equipped to operate at elevated pressure. In general it is preferred to conduct the polymerization at from about 10 to about 2000 lbs. per square inch (psi), and more preferably at from about 50 to about 1000 (psi).

Additives such as (a) camphorsulphonic acid (CSA), or (b) 2-fluoro-1-methyl pyridinium p-toluene sulfonate (FMPTS) having the chemical formulations shown below, can be added to the polymerization mixture to significantly increase the rate of polymerization. These additives and their usefulness in a stable free radical polymerization process are discussed in detail in E.P. 735,052, the disclosure of which is incorporated herein by reference.

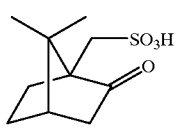

a)

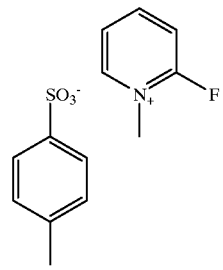

b)

Batch or metered addition of CSA to (meth)acrylate polymerizations with our nitroxides further enhances the monomer conversion. The polymers obtained from these acid accelerated polymerizations can be chain-extended with styrene to form block copolymers.

The molar ratio of nitroxide agent to free radical initiator is from about 1:1 to 10:1. The molar ratio of nitroxide agent to free radical initiator is preferably from about 1.3:1 to 1.7:1.

The influence of the ratio of initiator to stable free radical is significant in the polymerization of n-butyl acrylate when AIBN is used as the initiator. First-order plots of polymerization conducted in the presence of AIBN and the C7 nitroxide at 130° C. show that at a 1:1.6 ratio, the first-order plot becomes more linear. Below this ratio, an exotherm is often observed, the molecular weight does not increase with conversion, and the polydispersity is broad. Above this ratio molecular weight increases with increasing conversion. The exact stoichiometry is extremely important: 1:1.60 often gives an exotherm, whereas 1:1.70 gives a slow but controlled polymerization. The slightest experimental error or the presence of small amounts of impurities, then, can give widely varying results.

When benzoyl peroxide (BPO) is used as the initiator as opposed to AIBN, the polymerizations are insensitive toward the ratio of initiator to stable free radical. In general, broader polydispersities (>2) are also observed.

The processes of the present invention provide, in embodiments, a conversion rate or degree of polymerization as high as 95% by weight.

The processes of the present invention weight average molecular weights ranging from about 500 to about 200,000 and more preferably from about 2000 to about 100,000 while maintaining narrow polydispersity.

Applications of (meth)acrylate block copolymers or styrene block copolymers or styrene or (meth)acrylate homopolymers can include toner compositions, adhesives, cellulosic fiber binders, compatibilizers for thermoplastic blends, emulsifiers, thickeners, processing aids for thermoplastic resins, pigment dispersants, coatings, asphalt modifiers, molded articles, sheet molding compounds, and impact modifiers.

The present invention will now be described in greater detail in the following examples.

The styrene and n-butyl acrylate used in each of the foregoing examples were obtained from Aldrich. The inhibitors were removed using t-butyl catechol and hydroquinone inhibitor remover (Aldrich). Reaction samples were diluted with either THF or $CH_2Cl_2$ for GC analysis, which was done on a HP5890 GC with a HP-1 column and thermal conductivity detector running at a constant 150° C. oven temperature. The internal reference used was ortho-dichlorobenzene. GPC samples were evaporated by air drying and dried overnight at 60° C. in a vacuum oven. Molecular weights reported in the examples were determined by GPC in THF versus polystyrene standards.

As used in the examples, $M_n$ refers to the number average molecular weight, $M_w$ refers to the weight average molecular weight, $M_p$ refers to peak molecular weight, and PDI, the polydispersity ratio, is the ratio of the weight average molecular weight to the number average molecular weight.

EXAMPLE 1

N-tertbutyl-2-methyl-1,2-propanediamine (0.1 mol), chloroform (0.15 mol), acetone (0.2 mol), Aliquat 336 tricaprylylmethylammonium chloride (0.003 mol), and 100 mL toluene were mixed and cooled to 10° C. under nitrogen atmosphere. Solid sodium hydroxide beads (0.5 mol) were added in 30 minutes to keep the temperature below 20° C. After the addition and three hours stirring at 15–20° C., the reaction was filtered, dried over sodium sulfate and concentrated to afford greater than 90% yield of product, which was about 95% pure by gas chromatograph. The solidified product was recrystallized from hexanes to afford an analytically pure sample.

The amine was oxidized in the conventional manner to the corresponding dimethyl nitroxide by following procedures known by those skilled in the art and described in the reference Rozantzev, E. G., "Free Nitroxyl Radicals" (Plenum Press 1970).

EXAMPLE 2

Example 1 was repeated under identical conditions, with the exception that 4-methyl-2-pentanone was substituted for the acetone to give the iBu nitroxide.

EXAMPLE 3

Example 1 was repeated under identical conditions, with the exception that acetophenone was substituted for the acetone to give the phenyl nitroxide.

EXAMPLE 4

Example 1 was repeated under identical conditions with the exception that cyclopentanone was substituted for the acetone to give the C5 nitroxide.

EXAMPLE 5

Example 1 was repeated under identical conditions with the exception that cyclohexanone was substituted for the acetone to give the C6 nitroxide.

EXAMPLE 6

Example 1 was repeated under identical conditions with the exception that cycloheptanone was substituted for the acetone to give the C7 nitroxide.

EXAMPLE 7

2-Amino-2-methyl-1-propanol (17.8 g, 0.2 mol), chloroform (35.8 g, 0.3 mol), cycloheptanone (45.1 g, 0.4 mol), Aliquat 336 (3.23 g, 0.008 mol), and 120 mL toluene were mixed under nitrogen at 10° C. Sodium hydroxide beads (40.0 g, 0.5 mol) were added in 30 minutes to keep the temperature below 20° C. After stirring at 15–20° C. for another 2 hours and 45 minutes, the reaction was filtered and rinsed with a small amount of toluene. The solid was extracted with 2×100 mL methanol. The combined methanol solutions were concentrated to afford 61 g of the carboxylate intermediate. The white solid was refluxed with 80 mL concentrated hydrochloric acid in air for 10 hours. It was then cooled to about 75° C. and 150 mL toluene was then added. The excess acid and water were removed with a Dean-Stark trap. The toluene solution was concentrated and distilled to 185–195° C. at 14 mmHg to afford 35 g 3,3-hexamethylene-5,5-dimethyl-2-oxomorpholine as a clear yellow oil, which was used to make the nitroxide.

The amine was oxidized in the conventional manner referenced in Example 1 to give the C7 morpholone nitroxide.

EXAMPLE 8

Example 7 was repeated under identical conditions with the exception that the cycloheptanone was replaced with acetone to give the diMe morpholone.

EXAMPLE 9

Example 7 was repeated under identical conditions with the exception that cyclohexanone was substituted for the cycloheptanone to give the C6 morpholone.

EXAMPLE 10

Styrene (15 g), benzoyl peroxide (0.62 mmol, 0.150 g), and the C6 nitroxide (0.8 mmol, 0.125 g) of Example 5 were charged to a 150 mL cylindrical flask with a 4-head Teflon coated head equipped with condenser, bubbler, magnetic stir bar and two septa ports. The solution was purged thoroughly with argon for 15 minutes and then lowered into an oil bath preheated to 140° C. The polymerization was carried out for 6 hours. The polymer solution was diluted in 10 mL THF and precipitated into a ten times excess of methanol. The polymer was filtered and dried under vacuum overnight. A conversion of 67% (determined gravimetrically) and a yield of 9.9 g rams of polystyrene was obtained with $M_n$ equal to 12, 678, $M_p$ equal to 20, 044, $M_w$ equal to 18, 100 and PDI is 1.42.

EXAMPLE 11

Example 10 was repeated under identical conditions, with the exception that the dimethyl nitroxide of Example 1 was substituted for the C6 nitroxide. A conversion of 50% (determined gravimetrically) and a yield of 7.5 g rams of polystyrene were obtained with $M_n$ equal to 12,312, $M_p$ equal to 15,661, $M_w$ equal to 14,989, and PDI equal to 1.2.

EXAMPLE 12

Example 11 was repeated under identical conditions, with the exception that the phenyl nitroxide of Example 3 was substituted for the dimethyl nitroxide. A conversion of 54% (determined gravimetrically) and a yield of 8.1 g rams of polystyrene were obtained with $M_n$ equal to 13,306, $M_p$ equal to 16,624, $M_w$ equal to 15,919, and PDI equal to 1.19.

COMPARATIVE EXAMPLE 1

Example 10 was repeated under identical conditions, with the exception that TEMPO was substituted for the C6 nitroxide. A conversion of 35% (determined gravimetrically) and a yield of 5.2 g rams of polystyrene were obtained with $M_n$ equal to 8,174, $M_p$ equal to 11,130, $M_w$ equal to 10,406, and PDI equal to 1.27.

EXAMPLE 13

7 mL of n-butyl acrylate, 0.12 g of the isobutyl nitroxide of Example 2, and 0.074 g of BPO were heated at 130° C.

for 24 hours. A polymer having $M_n$ equal to 6800 and PDI equal to 1.32 was isolated in a 40% yield.

EXAMPLE 14

7 mL of n-butyl acrylate, 74 mg of BPO and 0.130 g of the C7 morpholone nitroxide of Example 7 were heated at 130° C. for 28 hours. A polymer having $M_n$ equal to 27,000 and PDI equal to 1.71 was isolated in a 50% yield.

COMPARATIVE EXAMPLE 2

Example 14 was repeated under identical conditions with the exception that 4-oxo TEMPO was substituted for the C7 morpholone nitroxide. A polymer having bimodal distribution was obtained in a 15% yield with $M_n$ equal to 3000, PDI equal to 2.06.

EXAMPLE 15

Tetramethyl morpholone (141.3 g, 0.90 mole), molybdenum oxide (3.0 g) and ethylbenzene (720 mL) were mixed and heated to 110° C. under $N_2$ atmosphere. t-Butyl hydroperoxide (70% aq. solution, 249.1 g, 2.49 mole) was added dropwise in 1 hour. The addition funnel was replaced with a distillation column and t-butyl alcohol-water was distilled over slowly in 15 hours. The reaction content was dried over sodium sulfate and concentrated to a dark oil, which solidified on standing. The solid was recrystallized from hexanes to obtain beige-colored crystals (155 g).

EXAMPLE 16

The styrene prepolymer end-capped with the C6 nitroxide formed in Example 10 (2 g), n-butyl acrylate (5 g), and DMSO (5 mL) were charged into a glass reactor of the type described in Example I, purged thoroughly with argon for 15 minutes, and then lowered into an oil bath preheated to 80° C. The prepolymer had a $M_n$ equal to 12,678, $M_w$ equal to 18,100 and a molecular weight distribution of 1.4. The polymerization was carried out for 6 hours. Samples were withdrawn with time to monitor the progress of the reaction. The polymer solution was diluted with THF and precipitated into a ten times excess of methanol. The polymer was filtered and dried under vacuum overnight.

The molecular weight data for the final polymer obtained after precipitation into methanol was $M_n$ equal to 18,524, $M_w$ equal to 51,899, with a molecular weight distribution of 1.4. An increased $\Delta M_w$ of 33,799 was obtained on formation of the block copolymer. Analysis of GC and NMR results indicated between 70–72% conversion of n-butyl acrylate. The molar incorporation of n-butyl acrylate in the diblock copolymer was found to be approximately 46%.

EXAMPLE 17

Example 16 was repeated under identical conditions, with the exception that after the low temperature initiation of 80° C. was used for 1 hour, the polymerization temperature was increased to 100° C. The polymerization temperature in the flask, however, did not increase beyond 90° C. A yield of 6 grams of diblock copolymer was obtained corresponding to approximately 90% conversion of n-butyl acrylate. The molecular weight data for the diblock copolymer was $M_n$ equal to 35,353, $M_w$ equal to 90,288, with a molecular weight distribution of 2.55. An increase in $\Delta M_w$ of 72,188 was obtained on formation of the block copolymer. NMR analysis indicated approximately 63% molar incorporation of n-butyl acrylate, corresponding to approximately 100% conversion of n-butyl acrylate.

EXAMPLE 18

Example 16 was repeated under identical conditions with the exception that after the low polymerization temperature of 80° C. was used for 1 hour, the polymerization temperature was increased to 150° C. The actual reaction temperature was between 135–140° C. for 6 hours. A yield of 4.3 grams was obtained, corresponding to approximately 61% conversion of n-butyl acrylate. The molecular weight data for the diblock copolymer was $M_n$ equal to 16,525, $M_w$ equal to 40,251, and PDI equal to 2.4. NMR indicated approximately 53% molar incorporation of n-butyl acrylate into the block copolymer. An increase in $M_w$ of 22,151 was obtained for the polymer after chain extension with n-butyl acrylate.

EXAMPLE 19

Example 10 was repeated under identical conditions with the exception that the C6 nitroxide was replaced with the C7 nitroxide of Example 6. The reaction was stopped at 52% conversion, the resultant prepolymer having $M_n$ equal to 10,735, $M_w$ equal to 13,221, and PDI equal to 1.23.

The prepolymer (2 g) and n-butyl acrylate (10 mL) were charged into a glass reactor of the type described in Example 10, purged thoroughly with argon for 15 minutes, and then lowered into an oil bath preheated to 140° C. The prepolymer had an $M_n$ equal to 10,735, $M_w$ equal to 13,221, and a molecular weight distribution of 1.23. The temperature inside the flask was at 130° C. The polymerization was carried out for approximately 23 hours. The polymer solution was diluted with THF and precipitated into a ten times excess of methanol. The polymer was filtered and dried under vacuum overnight.

The molecular weight data for the final polymer obtained after precipitation into methanol was $M_n$ equal to 20,720 and $M_w$ equal to 27,881, with a PDI equal to 1.34. Samples withdrawn from the reaction mixture indicated that the conversion increased with time.

EXAMPLE 20

Example 19 was repeated under identical conditions. Samples were withdrawn over time and are characterized in TABLE II.

TABLE II

| | SAMPLE 1 | SAMPLE 2 | SAMPLE 3 |
|---|---|---|---|
| $M_n$ | 17,534 | 19,555 | 21,881 |
| $M_w$ | 21,192 | 24,534 | 28,006 |
| PDI | 1.29 | 1.255 | 1.28 |
| Percentage Conversion | 29% | 48% | 50% |

EXAMPLE 21

Example 10 was repeated under identical conditions with the exception that 45 mL styrene, 0.19 g of the dimethyl morpholone nitroxide of Example 8 and 0.206 g BPO were used. The reaction was stopped at 47% conversion, the resultant prepolymer having $M_n$=18,500 $M_w$ equal to 26,800 and PDI equal to 1.45.

The styrene prepolymer end capped with the DiMe morpholone nitroxide ($M_n$=18,500, $M_w$=26,800, PDI=1.45) (5 g) and n-butyl acrylate (10 mL) were charged into a glass reactor of the type described in Example 10, purged thoroughly with argon for 15 minutes and then lowered into an oil bath preheated to 140° C. The polymerization was carried out for approximately 22 hours. The polymer solution was diluted with THF and precipitated into a ten times excess of methanol. The polymer was filtered and dried under vacuum overnight. The molecular weight data for the final polymer obtained after precipitation into methanol is set out in TABLE III.

EXAMPLE 22

Example 10 was repeated under identical conditions with the exception that 30 mL styrene, 0.36 g of the C7 morpholone nitroxide of Example 7 and 0.3 g of BPO were used. The reaction was stopped at 70% conversion, the resultant prepolymer having $M_n$ equal to 14,800, $M_w$=18,300, and PDI=1.24.

Example 21 was then repeated under identical conditions, except that the styrene prepolymer end capped with the C7 morpholone nitroxide ($M_n$=14,800, $M_w$=18,300, PDI=1.24) was substituted for the prepolymer of Example 21 and an additional 10 mL of n-butyl acrylate was used. The molecular weight data for the final polymer obtained after precipitation into methanol is set out in TABLE III, below. FIG. 1, a plot of molecular weight of the styrene-n-butyl acrylate block copolymer versus percent conversion, shows that molecular weight evolution with regard to conversion occurred in a linear fashion indicating a controlled free radical polymerization and a clean formation of the block copolymer. Molecular weights were determined by GPC in THF versus polystyrene standards. Data points were taken at 0, 3, 6, 9 and 23 hours.

Example 22 was then repeated under identical conditions, except that the styrene prepolymer end capped with the diMe morpholone nitroxide ($M_n$=14,800, $M_w$=18,000, PDI=1.47) was substituted for the prepolymer of Example 10 and an additional 10 mL of n-butyl acrylate was used. The molecular weight data for the final polymer obtained after precipitation into methanol is set out in TABLE III, below.

TABLE III

| Example No. | Polystyrene-nitroxide (g, Mn,) | n-butylacrylate (mL) | $M_n$(diblock) Exptal | $M_n$(diblock) Targeted | Conversion | PDI |
|---|---|---|---|---|---|---|
| 23 | C-dimethyl (10 g, 12K) | 20 | 22,400 | 36,000 | 65 | 1.54 |
| 21 | C-dimethyl 5 g, 18K) | 10 | 36,900 | 51,600 | 80 | 1.7 |
| 22 | C-7 10 g, 15K) | 20 | 34,500 | 41,000 | 85 | 1.68 |

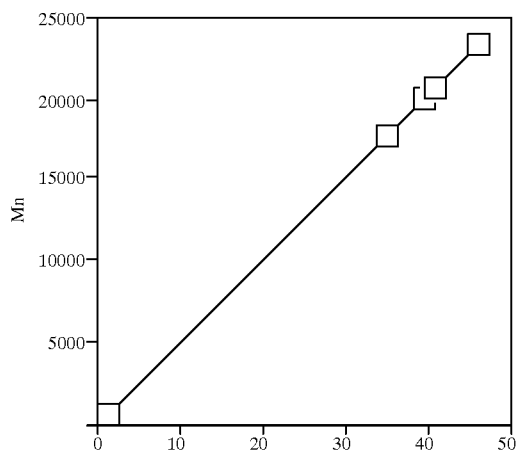

EXAMPLE 23

Example 10 was repeated under identical conditions with the exception that the C6 nitroxide was replaced with the diMe morpholone nitroxide of Example 8. The reaction was stopped at 80% conversion, the resultant prepolymer having $M_n$ equal to 12,900, $M_w$=19,100, and PDI equal to 1.24.

EXAMPLE 24

5 mL styrene, 116 mg BPO, and 174 mg of the dicyclohexyl nitroxide were heated at 130° C. for 4 hours. A polymer was obtained in 66% yield with $M_n$=6200, PDI=1.40. The synthesis procedure used for the dicyclohexyl nitroxide is known and is described with particularity in Yoshioka, T., Mori, E., and Murayama, K., "Synthesis and ESR Spectral properties of Hindered Piperazine N-Oxyls", Bulletin of the Chemical Society of Japan, Vol. 45, pp. 1855–1860 (1972).

The styrene prepolymer end-capped with the dicyclohexyl nitroxide ($M_n$=6200, PDI=1.40) (0.5 g ) was dissolved in 3 mL of n-butyl acrylate and heated at 130° C. for 20 hours. A block copolymer having $M_n$ equal to 8400 and PDI equal to 1.34 was obtained after 10% of the monomer was converted.

EXAMPLE 25

A three neck, 25 mL roundbottom flask equipped with a mechanical stirrer, temperature probe, argon inlet and condenser was charged with 5 mL styrene, 1 mL ortho-dichlorobenzene and 0.36 g of the n-butyl acrylate prepolymer obtained in Example 8 having an isobutyl nitroxide endgroup ($M_n$=6800, PDI=1.32). Argon was bubbled through the solution while stirring for 1 hour and the reaction mixture was lowered into a preheated oil bath at 130° C. The reaction was carried out overnight and was too viscous to sample for GC conversion. GPC analysis in THF showed a molecular weight increase to a $M_n$ equal to 53,000, and PDI equal to 2.2. GPC analysis in trichlorobenzene showed only a very small amount of n-butyl acrylate prepolymer remaining, indicating that the prepolymer contained virtually no dead chains.

EXAMPLE 26

A 100 mL reaction flask with a 45/50 joint was equipped with a reactor head and a stirbar. Through the center joint of the reactor head a near-infrared probe was fitted with teflon tape (UPO instruments, model Insight IV fiber optic spectrometer). The other joints were used for a condenser with bubbler, Argon inlet, temperature probe and sample port. The flask was charged with 54 g n-butyl acrylate, 0.95 g of the C7 morpholone nitroxide of Example 7, 0.34 g AIBN and 7.5 mL ortho-dichlorobenzene as the internal standard. A 25 mL syringe was filled with a 0.233 M solution of triflic acid in diethyl carbonate and fitted on a syringe pump. Through the sample port of the reactor, a syringe filled with 0.20 $M_n$ C7 morpholone nitroxide in diethyl carbonate was fitted. The mixture was heated at 130° C. and the reaction conversion was followed by GC and near infrared. Acid was metered in slowly until a rise in the reaction temperature, or increase in conversion was noted. At this point 0.1 mL of the nitroxide solution was injected which slowed the polymerization instantaneously. Addition of acid and nitroxide was continued while keeping the temperature of the reactor below 135° C. At the end of the polymerization, a polymer was obtained in 91% yield with $M_n$ equal to 6300, PDI equal to 4.3. This polymer was purified by precipitation from methanol to remove any impurities.

EXAMPLE 27

Example 26 was repeated under identical conditions with the exception that 198 mg of the isobutyl nitroxide of Example 2 was substituted for the C7 morpholone nitroxide. A polymer having $M_n$ equal to 81,900 and PDI equal to 2.07 was obtained in 82% yield.

EXAMPLE 28

The prepolymer of Example 27 (1 g) was heated in 5 mL of styrene with 0.5 mL of ortho-dichlorobenzene as an internal standard. After 16 hours at 130° C. a polymer having $M_n$ equal to 164,000 and PDI equal to 2.50 was isolated. GPC analysis in trichlorobenzene showed no trace of the starting prepolymer indicating that the acrylate-styrene block copolymer had formed completely.

EXAMPLE 29

5 mL of n-butyl acrylate and 48 mg of the adduct of ethylbenzene and dimethyl morpholone nitroxide formed in Example 15 were heated at 130° C. for 40 hours. A polymer having $M_n$ equal to 13,900 and PDI equal to 1.8 was obtained in 77% yield.

EXAMPLE 30

Styrene (2.5 g), AIBN (0.11 g) and the C7 morpholone of Example 7 (0.24 g) were heated at 130° C. for 4 hours. The prepolymer obtained in a 40% yield by precipitating the reaction in methanol had $M_n$ equal to 940 and a PDI equal to 1.12.

The prepolymer (1 g) was then heated in t-butyl acrylate at 130° C. for 6 hours. The conversion by GC of t-butyl acrylated was 44%. The resultant block copolymer had $M_n$ equal to 1600 and a PDI equal to 1.46.

COMPARATIVE EXAMPLE 3

A polystyrene prepolymer with a TEMPO endgroup (2 g) having $M_n$ equal to 20,500 and PDI equal to 1.28 was heated with 5 mL of t-butyl acrylate and 2 mL of DMSO at 128° C. After 5 hours, the polymer obtained contained no acrylate as determined by NMR.

EXAMPLE 31

The prepolymer of Example 22 (0.5 9) was heated in 2 mL dimethyl aminoethyl acrylate at 130° C. for 24 hours. The conversion of the acrylate monomer by GC was determined to be 37%. The polymer obtained was completely soluble in methanol and the molecular weight was determined by NMR to be 29,500, showing that a clean block copolymer was obtained.

EXAMPLE 32

The block copolymer of Example 22 (7 g) was heated in styrene at 140° C. for 17 hours. A triblock copolymer (18 g) was obtained having $M_n$ equal to 72,600 and PDI equal to 2.7.

The stable free radical mediated polymerization process claimed in a number of patents results in narrow polydispersity resins and linear molecular weight growth with conversion. This opens the possibility to synthesize block copolymers. The SFRP process depends uniquely on the stable free radical mediator used. The patents cited above use TEMPO and TEMPO derivatives and show examples of polymerization of styrene and styrene derivatives. However, as shown in the comparative Examples, these nitroxides do not enable efficient polymerization of acrylates either as homopolymers or in combination with other monomers to form block copolymers.

We have found, unexpectedly, that by altering the nitroxide structure to a highly hindered piperazone or morpholone nitroxide, acrylate polymerization mediated by these stable free radicals is feasible with high efficiency. Specifically, we have shown improved homopolymerization of acrylates using these nitroxides. We have also shown that block copolymers can be formed in very high yields starting with either styrene prepolymers endcapped with the new nitroxides or acrylate prepolymers endcapped with the new nitroxides. Indeed, the block copolymer formation occurs in a controlled fashion with formation of narrow polydispersity resins. These significant improvements are due to the structural differences between piperazone and morpholone nitroxides, on the one hand, and TEMPO and its derivatives, on the other.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

Having thus described the invention, it is claimed:

1. A free radical polymerization process for the preparation of a thermoplastic resin or resins comprising the step of:

heating from about 80° to about 160° C. a mixture of a free radical initiator, at least one free radically polymerizable monomer compound, and a stable free radical agent comprising a nitroxyl radical having the following formula:

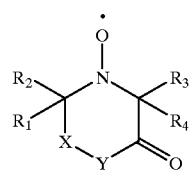

wherein X is $CH_2$ or C=O, Y is O or N—R, R, $R_1$, $R_2$, $R_3$, and $R_4$ are independently selected from the group consisting of aryl, alkyl having from 1 to about 24 carbon atoms, cycloalkyl having from 5 to about 7 carbon atoms, aralkyl having from 7 to about 20 carbon atoms, cyanoalkyl having from 2 to about 12 carbon atoms, ether having from 4 to about 18 carbon atoms, and hydroxyalkyl having from 1 to about 18 carbon atoms; and $R_1$ and $R_2$ together, or $R_3$ and $R_4$ together, or each pair, may be cyclized forming a ring having from about 5 to about 14 carbon atoms to form said thermoplastic resin or resins with a polydispersity of about 1.0 to about 3.0.

2. The process of claim 1 wherein said polymerizable monomer compound is a monoethylenically unsaturated carboxylic acid-free monomer selected from the group consisting of alkyl esters of (meth)acrylic acid, hydroxyalkyl esters of (meth)acrylic acid, (meth)acrylamide, (meth) acrylonitrile, vinyl acetate, and vinyl and vinylidene halides.

3. The process of claim 2 wherein said alkyl esters of (meth)acrylic acid are selected from the group consisting of methyl acrylate, ethyl acrylate, and butyl acrylate.

4. The process of claim 2 wherein said hydroxyalkyl esters of (meth)acrylic acid are selected from the group consisting of hydroxyethyl acrylate, hydroxypropyl acrylate, hydroxyethyl methacrylate and hydroxypropyl methacrylate.

5. The process of claim 1 wherein said polymerizable monomer compound is alkyl acrylate or alkyl methacrylate.

6. The process of claim 1 wherein said polymerizable monomer compound is selected from styrene, hydroxylated styrene, styrenesulfonic acid, and salts of styrene-sulfonic acid.

7. The process of claim 1 wherein said polymerizable monomer compound is n-butyl acrylate.

8. The process of claim 1 wherein said polymerizable monomer compound is t-butyl acrylate.

9. The process of claim 1 wherein said stable free radical agent is selected from the group consisting of 1-tertbutyl-3,3,5,5-tetramethyl-2-piperazinone-oxide, 3-isobutyl-1-isopropyl-3,5,5-trimethyl-2-piperazinone-oxide, 1-isopropyl-3-phenyl-3,5,5-trimethyl-2-piperazinone-oxide, 3,3-tetramethylene-5,5-dimethyl-1-isopropyl-2-piperazinone-oxide, 3,3-pentamethylene-5,5-dimethyl-1-isopropyl-2-piperazinone-oxide, 3,3-hexamethylene-5,5-dimethyl-1-isopropyl-2-piperazinone-oxide, and bis-3,3,5,5-pentamethylene-2,6-piperazinone-dione-oxide.

10. The process of claim 1 wherein said stable free radical agent is selected from the group consisting of 3,3,5,5-tetramethyl-2-morpholone-oxide, 3,3-pentamethylene-5,5-dimethyl-2-morpholone-oxide, and 3,3-hexamethylene-5,5-dimethyl-2-morpholone oxide.

11. The process of claim 1 wherein said free radical agent is 3,3-hexamethylene-5,5-dimethyl-2-morpholone oxide.

12. The process of claim 1 wherein the molar ratio of said stable free radical agent to said free radical initiator is from about 1:1 to about 10:1.

13. The process of claim 12 wherein the molar ratio of said stable free radical agent to said free radical initiator is from about 1.3:1 to about 1.7:1.

14. The process of claim 1 wherein the heating of said mixture is conducted in a solvent or diluent.

15. The process of claim 14 wherein said solvent is selected from the group consisting of ethylene glycol, propylene glycol, diethylene glycol, glycerine, dipropylene glycol, tetrahydrofuran and mixtures thereof.

16. The process of claim 1 wherein said free radical initiator is selected from the group consisting of peroxo compounds containing at least one O—O group.

17. The process of claim 1 wherein said free radical initiator is selected from the group consisting of hydrogen peroxide, t-butyl hydroperoxide, t-butyl perbenzoate, t-amyl perbenzoate, t-butyl peroctoate, t-amyl peroctoate, ditertiary butyl peroxide, tertiary-amyl hydroperoxide, dibenzoyl peroxide, potassium persulfate, and methyl ethyl ketone peroxide.

18. The process of claim 1 further comprising adding an inorganic acid, organic sulfonic acid or organic carboxylic acid during heating of said mixture thereby increasing the rate of formation of said thermoplastic resin or resins from said polymerization of said monomer compound.

19. The process of claim 18 wherein said organic sulfonic acid is camphorsulphonic acid.

20. The process of claim 19 wherein the step of adding said camphorsulphonic acid is conducted as batch or metered.

21. The process of claim 1 wherein the heating of said mixture is conducted with said mixture as a suspension in water or in a polar liquid.

22. The process of claim 1 wherein the heating of said mixture is conducted from about 110° C. to about 130° C.

23. The process of claim 1 wherein said polymerizable monomer compound is selected from the group consisting of styrene, hydroxylated styrene, styrenesulfonic acid, salts of styrenesulfonic acid, conjugated dienes, acrylates, (meth) acrylates, and mixtures thereof.

24. The process of claim 1 wherein said monomer to polymer conversion is up to 95 percent by weight.

25. The process of claim 1 further comprising the steps of:
isolating said thermoplastic resin or resins;
followed by washing and drying said thermoplastic resin or resins.

26. The process of claim 1 wherein the weight average molecular weight of the thermoplastic resin or resins is from about 2,000 to about 100,000.

27. A free radical polymerization process for the preparation of a thermoplastic resin or resins comprising the step of:
heating from about 80° C. to about 160° C. a mixture of at least one polymerizable monomer compound and a preformed nitroxide adduct having the following formula:

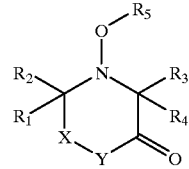

wherein X is $CH_2$ or C=O, Y is O or N—R, R, $R_1$, $R_2$, $R_3$, $R_4$, and $R_5$ are independently selected from the group consisting of aryl, alkyl having from 1 to about 24 carbon atoms, cycloalkyl having from 5 to about 7 carbon atoms, aralkyl having from 7 to about 20 carbon atoms, cyanoalkyl having from 2 to about 12 carbon atoms, ether having from 4 to about 18 carbon atoms, and hydroxyalkyl having from 1 to about 18 carbon atoms; and $R_1$ and $R_2$ together, or $R_3$ and $R_4$ together, or each pair, may be cyclized forming a ring having from about 5 to about 14 carbon atoms to form said thermoplastic resin or resins with a polydispersity from about 1.0 to about 3.0.

28. The process of claim 27 wherein said polymerizable monomer compound is a monoethylenically unsaturated carboxylic acid-free monomer selected from the group consisting of alkyl esters of (meth)acrylic acid, hydroxyalkyl esters of (meth)acrylic acid, (meth)acrylamide, (meth) acrylonitrile, vinyl acetate, and vinyl and vinylidene halides.

29. The process of claim 28 wherein said alkyl esters of (meth)acrylic acid are selected from the group consisting of methyl acrylate, ethyl acrylate, and butyl acrylate.

30. The process of claim 28 wherein said hydroxyalkyl esters of (meth)acrylic acid are selected from the group consisting of hydroxyethyl acrylate, hydroxypropyl acrylate, hydroxyethyl methacrylate and hydroxypropyl methacrylate.

31. The process of claim 27 wherein said polymerizable monomer compound is alkyl acrylate or alkyl methacrylate.

32. The process of claim 27 wherein said polymerizable monomer compound is styrene or styrene derivatives.

33. The process of claim 27 wherein said polymerizable monomer compound is n-butyl acrylate or acrylate derivatives.

34. The process of claim 27 wherein said polymerizable monomer compound is t-butyl acrylate or acrylate derivatives.

35. The process of claim 27 further comprising adding an inorganic acid, organic sulfonic acid or organic carboxylic acid during heating of said mixture thereby increasing the rate of formation of said thermoplastic resin or resins from said polymerization of said monomer compound.

36. The process of claim 35 wherein said organic sulfonic acid is camphorsulphonic acid.

37. The process of claim 36 wherein the step of adding said camphorsulphonic acid is conducted as a batch or metered process.

38. The process of claim 27 wherein the heating of said mixture is conducted from about 110° C. to about 130° C.

39. The process of claim 27 wherein said polymerizable monomer compound is selected from the group consisting of styrene and derivatives thereof, conjugated dienes and derivatives thereof, acrylates and derivatives thereof, and mixtures thereof.

40. The process of claim 27 wherein said monomer to polymer conversion is up to 95 percent by weight.

41. A free radical polymerization process for the preparation of a (meth)acrylate containing block copolymer comprising the steps of:
   (a) heating from about 80° to about 160° C. a first mixture of a free radical initiator, a first polymerizable monomer compound, and a stable free radical agent comprising a nitroxyl radical having the following formula:

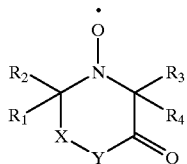

wherein X is $CH_2$ or $C=O$, Y is O or N—R, R, $R_1$, $R_2$, $R_3$, and $R_4$ are independently selected from the group consisting of aryl, alkyl having from 1 to about 24 carbon atoms, cycloalkyl having from 5 to about 7 carbon atoms, aralkyl having from 7 to about 20 carbon atoms, cyanoalkyl having from 2 to about 12 carbon atoms, ether having from 4 to about 18 carbon atoms, and hydroxyalkyl having from 1 to about 18 carbon atoms; and
   $R_1$ and $R_2$ together, or $R_3$ and $R_4$ together, or each pair, may be cyclized forming a ring having from about 5 to about 14 carbon atoms to form a prepolymer; and
   (b) heating from about 80° C. to about 160° C. a second mixture of said prepolymer and a second polymerizable monomer compound, said second polymerizable monomer compound being different than said first polymerizable compound.

42. The process of claim 41 wherein said first or second polymerizable monomer compound is a monoethylenically unsaturated carboxylic acid-free monomer selected from the group consisting of alkyl esters of (meth)acrylic acid, hydroxyalkyl esters of (meth)acrylic acid, (meth)acrylamide, (meth)acrylonitrile, vinyl acetate, and vinyl and vinylidene halides.

43. The process of claim 42 wherein said alkyl esters of (meth)acrylic acid are selected from the group consisting of methyl acrylate, ethyl acrylate, and butyl acrylate.

44. The process of claim 42 wherein said hydroxyalkyl esters of (meth)acrylic acid are selected from the group consisting of hydroxyethyl acrylate, hydroxypropyl acrylate, hydroxyethyl methacrylate and hydroxypropyl methacrylate.

45. The process of claim 41 wherein said first or second polymerizable monomer compound is alkyl acrylate or alkyl methacrylate.

46. The process of claim 41 wherein said first or second polymerizable monomer compound is styrene or styrene derivatives.

47. The process of claim 41 wherein said first or second polymerizable monomer compound is n-butyl acrylate or acrylate derivatives.

48. The process of claim 41 wherein said first or second polymerizable monomer compound is t-butyl acrylate or acrylate derivatives.

49. The process of claim 41 wherein said stable free radical agent is selected from the group consisting of 1-tertbutyl-3,3,5,5-tetramethyl-2-piperazinone-oxide, 3-isobutyl-1-isopropyl-3,5,5-trimethyl-2-piperazinone-oxide, 1-isopropyl-3-phenyl-3,5,5-trimethyl-2-piperazinone-oxide, 3,3-tetramethylene-5,5-dimethyl-1-isopropyl-2-piperazinone-oxide, 3,3-pentamethylene-5,5-dimethyl-1-isopropyl-2-piperazinone-oxide, 3,3-hexamethylene-5,5-dimethyl-1-isopropyl-2-piperazinone-oxide, and bis-3,3,5,5-pentamethylene-2,6-piperazinone-dione-oxide.

50. The process of claim 41 wherein said stable free radical agent is selected from the group consisting of 3,3,5,5-tetramethyl-2-morpholone-oxide, 3,3-pentamethylene-5,5-dimethyl-2-morpholone-oxide, and 3,3-hexamethylene-5,5-dimethyl-2-morpholone oxide.

51. The process of claim 41 wherein said free radical agent is 3,3-hexamethylene-5,5-dimethyl-2-morpholone oxide.

52. The process of claim 41 wherein the molar ratio of said stable free radical agent to said free radical initiator is from about 1:1 to about 10:1.

53. The process of claim 52 wherein the molar ratio of said stable free radical agent to said free radical initiator is from about 1.3:1 to about 1.7:1.

54. The process of claim 41 wherein said free radical initiator is selected from the group consisting of peroxo compounds containing at least one O—O group.

55. The process of claim 41 wherein said free radical initiator is selected from the group consisting of hydrogen peroxide, t-butyl hydroperoxide, t-butyl perbenzoate, t-amyl perbenzoate, t-butyl peroctoate, t-amyl peroctoate, ditertiary butyl peroxide, tertiary-amyl hydroperoxide, dibenzoyl peroxide, potassium persulfate, and methyl ethyl ketone peroxide.

56. The process of claim 41 further comprising adding an inorganic acid, organic sulfonic acid or organic carboxylic acid during heating of said mixture thereby increasing the rate of formation of said thermoplastic resin or resins.

57. The process of claim 56 wherein said organic sulfonic acid is camphorsulphonic acid.

58. The process of claim 57 wherein the step of adding said camphorsulphonic acid is conducted as batch or metered.

59. The process of claim 41 wherein the heating of said first or second mixture is conducted from about 110° C. to about 130° C.

60. The process of claim 41 wherein said polymerizable monomer compound is selected from the group consisting of styrene and derivatives thereof, conjugated dienes and derivatives thereof, acrylates and derivatives thereof, and mixtures thereof.

61. A free radical polymerization process for the preparation of a (meth)acrylate containing block copolymer comprising the steps of:
(a) heating from about 80° C. to about 160° C. a first mixture of a first polymerizable monomer compound and a preformed nitroxide adduct having the following formula:

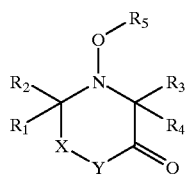

wherein X is $CH_2$ or C=O, Y is O or N—R, R, $R_1$, $R_2$, $R_3$, $R_4$, and $R_5$ are independently selected from the group consisting of aryl, alkyl having from 1 to about 24 carbon atoms, cycloalkyl having from 5 to about 7 carbon atoms, aralkyl having from 7 to about 20 carbon atoms, cyanoalkyl having from 2 to about 12 carbon atoms, ether having from 4 to about 18 carbon atoms, and hydroxyalkyl having from 1 to about 18 carbon atoms; and
$R_1$ and $R_2$ together, or $R_3$ and $R_4$ together, or each pair, may be cyclized forming a ring having from about 5 to about 14 carbon atoms to form a prepolymer; and
(b) heating from about 80° C. to about 160° C. a second mixture of said prepolymer and a second polymerizable monomer compound, said second polymerizable monomer compound being different than said first polymerizable compound.

62. The process of claim 61 wherein said first or second polymerizable monomer compound is a monoethylenically unsaturated carboxylic acid-free monomer selected from the group consisting of alkyl esters of (meth)acrylic acid, hydroxyalkyl esters of (meth)acrylic acid, (meth)acrylamide, (meth)acrylonitrile, vinyl acetate, and vinyl and vinylidene halides.

63. The process of claim 62 wherein said alkyl esters of (meth)acrylic acid are selected from the group consisting of methyl acrylate, ethyl acrylate, and butyl acrylate.

64. The process of claim 62 wherein said hydroxyalkyl esters of (meth)acrylic acid are selected from the group consisting of hydroxyethyl acrylate, hydroxypropyl acrylate, hydroxyethyl methacrylate and hydroxypropyl methacrylate.

65. The process of claim 61 wherein said first or second polymerizable monomer compound is alkyl acrylate or alkyl methacrylate.

66. The process of claim 61 wherein said first or second polymerizable monomer compound is styrene or styrene derivatives.

67. The process of claim 61 wherein said first or second polymerizable monomer compound is n-butyl acrylate or acrylate derivatives.

68. The process of claim 61 wherein said first or second polymerizable monomer compound is t-butyl acrylate or acrylate derivatives.

69. The process of claim 61 further comprising adding an inorganic acid, organic sulfonic acid or organic carboxylic acid during heating of said mixture thereby increasing the rate of formation of said thermoplastic resin or resins.

70. The process of claim 69 wherein said organic sulfonic acid is camphorsulphonic acid.

71. The process of claim 70 wherein the step of adding said camphorsulphonic acid is conducted as batch or metered.

72. The process of claim 61 wherein the heating of said first or second mixture is conducted from about 110° C. to about 130° C.

73. The process of claim 61 wherein said first or second polymerizable monomer compound is selected from the group consisting of styrene and derivatives thereof, conjugated dienes and derivatives thereof, acrylates and derivatives thereof, and mixtures thereof.

74. The process of claim 61 wherein said monomer to polymer conversion is up to 95 percent by weight.

75. A free radical polymerization process for the preparation of a (meth)acrylate containing triblock copolymer comprising the steps of:
(a) heating from about 80° to about 160° C. a first mixture of a free radical initiator, a first polymerizable monomer compound, and a stable free radical agent comprising a nitroxyl radical having the following formula:

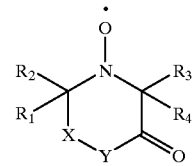

wherein X is $CH_2$ or C=O, Y is O or N—R, R, $R_1$, $R_2$, $R_3$, and $R_4$ are independently selected from the group consisting of aryl, alkyl having from 1 to about 24 carbon atoms, cycloalkyl having from 5 to about 7 carbon atoms, aralkyl having from 7 to about 20 carbon atoms, cyanoalkyl having from 2 to about 12 carbon atoms, ether having from 4 to about 18 carbon atoms, and hydroxyalkyl having from 1 to about 18 carbon atoms; and
$R_1$ and $R_2$ together, or $R_3$ and $R_4$ together, or each pair, may be cyclized forming a ring having from about 5 to about 14 carbon atoms, to form a prepolymer;
(b) heating from about 80° C. to about 160° C. a second mixture of said prepolymer and a second polymerizable monomer compound, said second polymerizable monomer compound being different than said first polymerizable compound, to form a block copolymer; and
(c) heating from about 80° C. to about 160° C. a third mixture of said block copolymer and a third polymerizable compound.

76. The process of claim 75 wherein said first, second, or third polymerizable monomer compound is a monoethylenically unsaturated carboxylic acid-free monomer selected from the group consisting of alkyl esters of (meth)acrylic acid, hydroxyalkyl esters of (meth)acrylic acid, (meth)acrylamide, (meth)acrylonitrile, vinyl acetate, and vinyl and vinylidene halides.

77. The process of claim 76 wherein said alkyl esters of (meth)acrylic acid are selected from the group consisting of methyl acrylate, ethyl acrylate, and butyl acrylate.

78. The process of claim 76 wherein said hydroxyalkyl esters of (meth)acrylic acid are selected from the group consisting of hydroxyethyl acrylate, hydroxypropyl acrylate, hydroxyethyl methacrylate and hydroxypropyl methacrylate.

79. The process of claim 75 wherein said first, second, or third polymerizable monomer compound is alkyl acrylate or alkyl methacrylate.

80. The process of claim 75 wherein said first, second, or third polymerizable monomer compound is styrene or styrene derivatives.

81. The process of claim 75 wherein said first, second, or third polymerizable monomer compound is n-butyl acrylate or acrylate derivatives.

82. The process of claim 75 wherein said first, second, or third polymerizable monomer compound is t-butyl acrylate or acrylate derivatives.

83. The process of claim 75 wherein said stable free radical agent is selected from the group consisting of 1-tertbutyl-3,3,5,5-tetramethyl-2-piperazinone-oxide, 3-isobutyl-1-isopropyl-3,5,5-trimethyl-2-piperazinone-oxide, 1-isopropyl-3-phenyl-3,5,5-trimethyl-2-piperazinone-oxide, 3,3-tetramethylene-5,5-dimethyl-1-isopropyl-2-piperazinone-oxide, 3,3-pentamethylene-5,5-dimethyl-1-isopropyl-2-piperazinone-oxide, 3,3-hexamethylene-5,5-dimethyl-1-isopropyl-2-piperazinone-oxide, and bis-3,3,5,5-pentamethylene-2,6-piperazinone-dione-oxide.

84. The process of claim 75 wherein said stable free radical agent is selected from the group consisting of 3,3,5,5-tetramethyl-2-morpholone-oxide, 3,3-pentamethylene-5,5-dimethyl-2-morpholone-oxide, and 3,3-hexamethylene-5,5-dimethyl-2-morpholone oxide.

85. The process of claim 75 wherein said free radical agent is 3,3-hexamethylene-5,5-dimethyl-2-morpholone oxide.

86. The process of claim 75 wherein the molar ratio of said stable free radical agent to said free radical initiator is from about 1:1 to about 10:1.

87. The process of claim 86 wherein the molar ratio of said stable free radical agent and said free radical initiator is from about 1.3:1 to about 1.7:1.

88. The process of claim 75 wherein said first, second, or third polymerizable monomer compound is selected from the group consisting of styrene and derivatives thereof, conjugated dienes and derivatives thereof, acrylates and derivatives thereof, and mixtures thereof.

89. In a free radical polymerization process for the preparation of a thermoplastic resin or resins of the type comprising heating from about 80° C. to about 160° C. a mixture of a free radical initiator, a nitroxide stable free radical agent, and at least one polymerizable monomer compound, to form said thermoplastic resin or resins having a high monomer to polymer conversion and a narrow polydispersity, wherein the improvement comprises:

said nitroxide stable free radical agent being a nitroxide radical having the following formula:

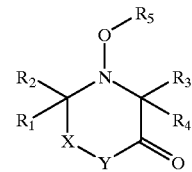

wherein X is $CH_2$ or $C=O$, Y is O or N—R, R, $R_1$, $R_2$, $R_3$, $R_4$, and $R_5$ are independently selected from the group consisting of aryl, alkyl having from 1 to about 24 carbon atoms, cycloalkyl having from 5 to about 7 carbon atoms, aralkyl having from 7 to about 20 carbon atoms, cyanoalkyl having from 2 to about 12 carbon atoms, ether having from 4 to about 18 carbon atoms, and hydroxyalkyl having from 1 to about 18 carbon atoms; and $R_1$ and $R_2$ together, or $R_3$ and $R_4$ together, or each pair, may be cyclized forming a ring having from about 5 to about 14 carbon atoms.

90. The process of claim 89 wherein said stable free radical agent is selected from the group consisting of 1-tertbutyl-3,3,5,5-tetramethyl-2-piperazinone-oxide, 3-isobutyl-1-isopropyl-3,5,5-trimethyl-2-piperazinone-oxide, 1-isopropyl-3-phenyl-3,5,5-trimethyl-2-piperazinone-oxide, 3,3-tetramethylene-5,5-dimethyl-1-isopropyl-2-piperazinone-oxide, 3,3-pentamethylene-5,5-dimethyl-1-isopropyl-2-piperazinone-oxide, 3,3-hexamethylene-5,5-dimethyl-1-isopropyl-2-piperazinone-oxide, and bis-3,3,5,5-pentamethylene-2,6-piperazinone-dione-oxide.

91. The process of claim 89 wherein said stable free radical agent is selected from the group consisting of 3,3,5,5-tetramethyl-2-morpholone-oxide, 3,3-pentamethylene-5,5-dimethyl-2-morpholone-oxide, and 3,3-hexamethylene-5,5-dimethyl-2-morpholone oxide.

92. The process of claim 89 wherein said free radical agent is 3,3-hexamethylene-5,5-dimethyl-2-morpholone oxide.

93. The process of claim 89 wherein said polymerizable monomer compound is selected from the group consisting of styrene and derivatives thereof, conjugated dienes and derivatives thereof, acrylates and derivatives thereof, and mixtures thereof.

* * * * *